United States Patent [19]

Cunningham

[11] Patent Number: 5,091,981
[45] Date of Patent: Feb. 25, 1992

[54] TRAVELING WAVE OPTICAL MODULATOR

[75] Inventor: David G. Cunningham, Wickwar, England

[73] Assignee: BT&D Technologies Limited, United Kingdom

[21] Appl. No.: 548,978

[22] PCT Filed: Apr. 28, 1989

[86] PCT No.: PCT/GB89/00456
§ 371 Date: Aug. 1, 1990
§ 102(e) Date: Aug. 1, 1990

[87] PCT Pub. No.: WO89/10577
PCT Pub. Date: Nov. 2, 1989

[30] Foreign Application Priority Data

Apr. 29, 1988 [GB] United Kingdom ............. 8810285

[51] Int. Cl.$^5$ .............................................. G02B 6/10
[52] U.S. Cl. ....................................... 385/3; 385/1
[58] Field of Search ......................... 350/96.12, 96.14

[56] References Cited

U.S. PATENT DOCUMENTS

| | | | |
|---|---|---|---|
| 3,393,954 | 7/1968 | Enderby et al. | 350/96.14 |
| 3,791,718 | 2/1974 | Chow | 350/160 R |
| 4,380,364 | 4/1983 | Marcatili | 350/96.14 |
| 4,679,893 | 7/1987 | Ramer | 350/96.14 |
| 4,685,988 | 8/1987 | Wagner et al. | 350/96.14 X |
| 4,770,483 | 9/1988 | Ridgway | 350/96.14 X |
| 4,843,350 | 6/1989 | Nazarathy et al. | 350/96.14 X |
| 4,843,586 | 6/1989 | Nazarathy et al. | 350/96.14 X |

FOREIGN PATENT DOCUMENTS 2138587 10/1984 United Kingdom .

OTHER PUBLICATIONS

Korotky et al.—"Fully Connectorized High-Speed Ti:LiNbO3 Switch/Modulator for Time—Division Multiplexing and Data Encoding"—IEEE Journal of Lightwave Technology, vol. Lt-3, No. 1, Feb. 1985—, pp. 1-6.
Minakata—"Efficient LiNbO3, balanced bridge modulator/switch with an ion-etched slot"-Appl. Phys. Lett. 35(1), 1 Jul. 1979—, pp. 40-42.
M. DeMicheli et al.—"Fabrication and Characterization of Titanium Indiffused Proton Exchanged (TIPE) Waveguides in Lighium Niobate"—Optics Communications—vol. 42, No. 2-15, Jun. 1982, pp. 101-103.
Alferness—"Waveguide Electrooptic Modulators'-'—IEEE Transactions on Microwave Theory and Techniques, vol. MTT-30, No. 8, Aug. 1982, pp. 1121-1137.
Alferness et al.,—"Velocity—Matching Techniques for Integrated Optic Traveling Wave Switch/Modulators'-'—IEEE Journal of Quantum Electronics, vol. QE-20, No. 3, Mar. 1984—, pp. 301-309.
White et al.—"Electro-Optical Modulators Employing Intermittent Intraction"—Proceedings of the IEEE, Jan. 1963—, p. 214.
Parsons et al.—"Design of efficient and wideband travelling-wave modulators"—SPIE Integrated Optical Circuit Engineering, 111, Innsbruck, Austria, Apr. 1986, (vol. 651).
Kubota et al.—"Traveling Wave Optical Modulator Using a Directional Coupler LiNbO3 Waveguide"-:—IEEE Journal of Quantum Electronics, vol. QE-16, No. 7, Jul. 1950, pp. 745-760.

Primary Examiner—John D. Lee
Assistant Examiner—Phan T. Heartney
Attorney, Agent, or Firm—Nixon & Vanderhye

[57] ABSTRACT

A travelling wave optical modulator comprises a Z-cut lithium niobate substrate on which is formed a proton exchanged optical waveguide and a travelling wave electrode. The optical waveguide is removed from the electrode intermittently to bring an optical signal in the optical waveguide back into phase with an electric field passing along the electrode. The optical signal is delayed relative to the electric field thereby allowing modulation of the optical signal by a non-periodic electric field. The optical waveguide is defined within the boundaries of the top surface of the substrate.

8 Claims, 2 Drawing Sheets

TRAVELING WAVE OPTICAL MODULATOR

BACKGROUND AND SUMMARY OF THE INVENTION

This invention relates to a travelling wave optical modulator and particularly, but not exclusively, to a modulator for broad-band operation. By optical is meant that part of the electro-magnetic spectrum which is generally known as the visible region together with those parts of the infra-red and ultra-violet regions at each end of the visible region which are capable of being transmitted by dielectric optical waveguides.

Guided-wave modulators which exploit the electro-optic effect are finding many applications in optical transmission and processing systems. Lithium niobate integrated optical devices are attractive, for example, as they require low drive voltages and can be fabricated by planar processes.

The electro-optic effect in semiconductor and dielectric waveguides is relatively weak, and so in order to operate efficiently at high modulation frequencies above one or two gigahertz a travelling wave structure, as opposed to a lumped electrode, is usually employed. That is, the electrode is designed as a transmission line matched to a microwave modulating input signal with the modulating signal fed colinearly with the propagating optical wave.

The bandwidth of a basic travelling wave device is limited by any mismatch between the velocities of the modulating signal propagating down the electrode and the optical signal propagating down the waveguide which causes "walk-off" of the two signals. If the velocities are equal the electrode length can be arbitrarily long allowing a low drive voltage to achieve the required phase change. However, some important materials such as lithium niobate have an inherent mismatch in these velocities so any attempt to reduce the drive voltage and power by increasing the length of the device will decreases the maximum possible drive frequency. One approach to overcoming this limitation, discussed in a paper entitled "Velocity—Matching Techniques for Integrated Optic Travelling Wave Switch/Modulators" by R. C. Alferness, S. K. Korotky and E. A. J. Marcatilli, IEEE Jul Qu Elec Vol QE-20 No. March 1984, is velocity matching by intermittent interaction. The electrode is split apart from the optical waveguide before or at a point where the velocity mismatch between the modulating signal and the optical signal would result in sufficient 'walk-off' of the signals to cause a polarity reversal of the applied field. The electrode is returned to rejoin the waveguide at a re-joining point, the electrode and waveguide path having lengths between the splitting and rejoining point designed so that the optical signal in the waveguide is advanced relative to the electrode signal sufficiently to once again be subject to induced phase shifts over the next section of coincident electrode and waveguide that are in phase with those induced in the previous section. This is repeated to obtain the total effect on the phase of the optical signal required.

A disadvantage of this known intermittent interaction, velocity-matching technique is that although it provides a method of compensating the velocity-mismatch at a given predetermined, high frequency it produces no substantial increase in band width over that of a velocity-mismatch limited travelling-wave optical modulator and the accumulated phase shift generally displays a complicated dependence on the applied, modulating signal frequency. Further, it cannot operate with non-periodic modulating signals as the optical signal is modulated by successively advanced portions of the modulating signal as it progresses from one section to the next.

An alternative approach to providing intermittent action is to compensate for the walk-off by designing the optical and electrode paths such that the optical signal is retarded relative to the electrode signal to achieve the required phase matching for the subsequent interaction. Previously implementations have relied on bulk crystals with parallel reflectors to reflect a freely propagating optical signal along a zig-zag path to pass intermittently within an interaction region formed by a shorter zig-zag or straight electrode; see U.S. Pat. No. 3,791,718 and U.S. Pat. No. 3,393,954 respectively. Such known intermittent interaction optical modulators are, not however, suited to forming to fully integrated optical circuits, require careful preparation and handling of the reflective surfaces and accurate alignment of the light input to ensure the optical signal propagates in the required interaction region.

According to the present invention a travelling wave optical modulator comprises a substrate, an optical waveguide defined within the boundaries of a surface of the substrate; a travelling wave electrode by which a modulated electric field of a predetermined frequency is applicable to at least a portion of the optical waveguide; and one or more delay portions between a respective splitting point and rejoining point where the optical waveguide is separated from the electrode and for which the transit time between the splitting point and rejoining point is greater for an optical signal in the optical waveguide than for the electric field in the electrode.

With this arrangement of intermittent interaction the optical signal is delayed relative to the electrode signal to compensate for the accrued walk-off but, in contrast to known intermittent interaction devices, it is returned to rejoin the electrode so as to be modulated by the same electrode signal. The electrode signal therefore need not be periodic.

BRIEF DESCRIPTION OF THE DRAWINGS

Embodiments of the invention will now be described, by way of example only, with reference to the accompanying drawing in which.

DETAILED DESCRIPTION OF THE PREFERRED EMBODIMENTS

Figure 1:
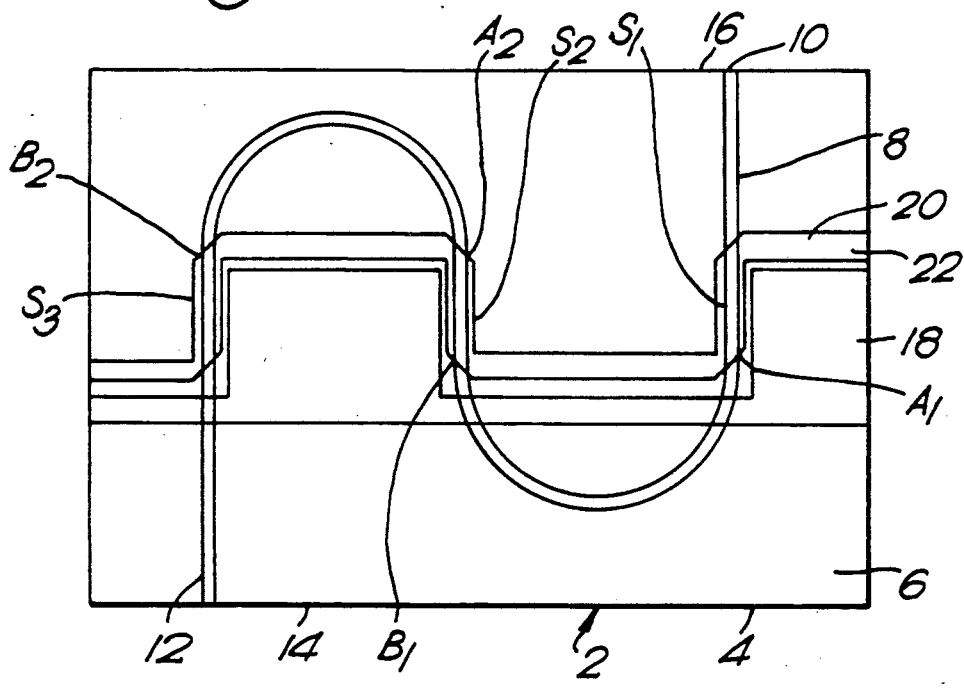
FIG. 1 is a diagramatic plan view of a first embodiment of a travelling wave optical modulator according to the present invention having a proton exchanged optical waveguide.

Referring to FIG. 1, a travelling wave optical modulator 2 comprises a Z-cut lithium niobate substrate 4 having at its top-Z face surface 6 a generally S-shaped proton-exchange optical waveguide 8 formed in a known manner. The waveguide terminates at ends 10 and 12 at polished end faces 14 and 16 respectively to permit ready connection to fibre optic waveguides (not shown) for the input of optical signals and the output of corresponding optical signals after modulation.

An earth plane 8 and hot electrode 20 of aluminium, fabricated by e-beam evaporation, photolithograph and plasma etching on top of a dielectric buffer layer (e.g. $Sio_2$, 0.25 $\mu$m thick) on the top surface 6 of the $LNbO_3$ substrate 4 together form a travelling wave electrode which defines active modulating region 22 beneath the hot electrode 20. The corners of the hot electrode 20 are truncated on the outside of its right angle bends with the ratio of the length of the truncation edge to hot electrode width being appoximately 1.3.

The optical waveguide 8 lies within the modulating region 22 at three equal length sections $S_1$, $S_2$ and $S_3$. Assuming an optical signal enters at end 10 it will be influenced by a modulating signal passing along the travelling wave electrode while in section $S_1$ until a first splitting point $A_1$. The optical waveguide is then apart from the active region 22 until it rejoins at a first rejoining point $B_1$. The above action is then repeated through the section $S_2$ and second splitting and rejoining points $A_2$ and $B_2$, respectively. Finally the optical signal will pass along section $S_3$ before a final splitting from the active region 22 to exit the device at waveguide end 12.

The lengths of the electrical waveguide and optical waveguide between the splitting and rejoining points $A_1$, and $B_1$ are such that the total transit times of the optical and electrical signal along the strips along their respective paths A1 and B1 are the same. The optical and electrical signals thereafter enter the strip $S_2$ in the same phase relationship as they entered strip $S_1$. Similarly the optical signal is delayed relative to the microwave signal between the second splitting and rejoining points $A_2$ and $B_2$ so they enter strip $S_3$ with the same initial phase relationship as they entered $S_1$ and $S_2$.

The above referenced paper calculates that the walk-off between the optical and microwave signals after an interaction length is given by $$\frac{2\pi Nm}{C} fl w$$

where
$w = (1 - No/Nm)$
No is the optical index;
Nm is the microwave index;
C is the speed of light; and
f is the microwave frequency.
In the device of FIG. 1 the strips $S_1$, $S_2$ and $S_3$ are each of a length L such that $$\frac{2\pi Nm}{C} L f_d = \pi$$

for an arbitrary design frequency, $f_d$ so the optical and microwave are split apart at the splitting points just as the walk-off results in a polarity reversal of the applied field. The optical waveguide lengths between $A_1$ and $B_1$ is $L(1 - No/Nm)$ longer than the travelling waveguide between these points.

The particular advantage of using proton exchanged optical waveguides is that a radius of curvature is sufficiently small to allow the optical waveguide to be removed from and rejoined with the hot electrode within the boundaries of the substrate without the requirement for reflecting surfaces as in, for example, the third and fourth embodiments.

Figure 2:
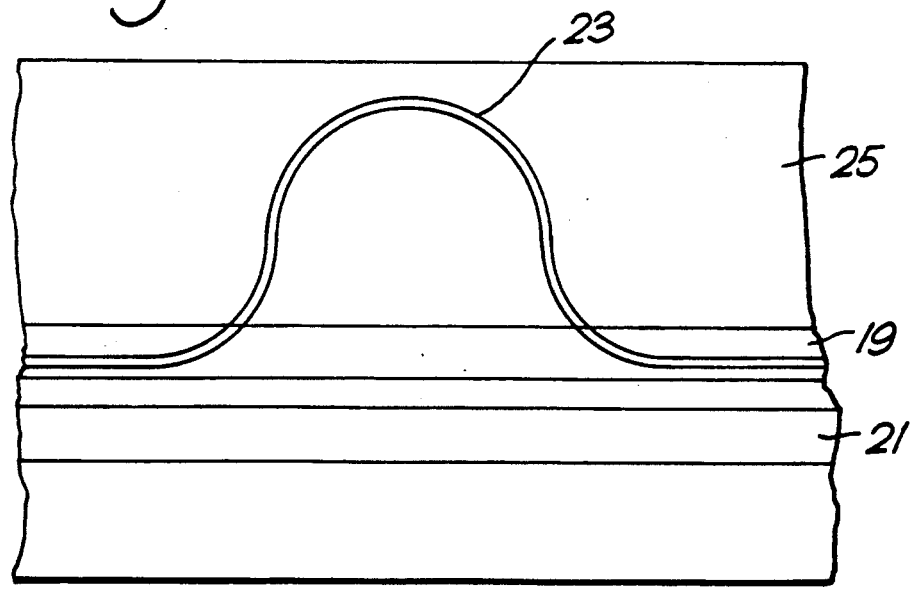
FIG. 2 is a diagramatic plan view of a second embodiment of the present invention having a proton exchanged optical waveguide.

Other geometric arrangements of the waveguides are possible, as for example as is shown in FIG. 2 showing a section of a travelling wave optical modulator having a straight hot electrode 19 and earth plane 21, the former overlying portions of a proton exchanged optical waveguide 23 on the surface of a Z-cut $LiNbO_3$ wafer 25. The principle of operation is as for the device shown in FIG. 1.

Figure 3:
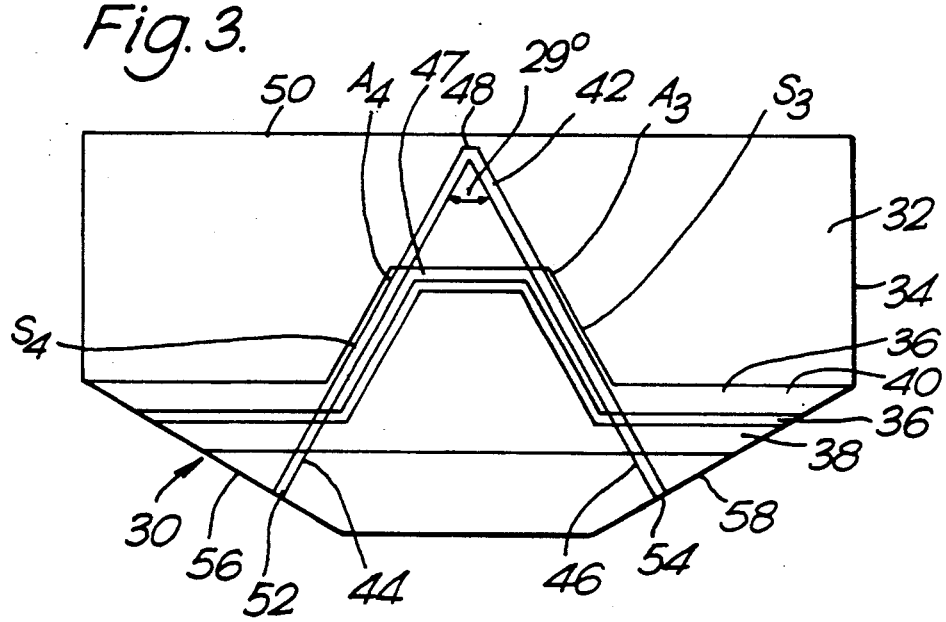
FIG. 3 is a diagramatic plan view of a second embodiment of the present invention in which the optical waveguide includes a reflective element near a substrate surface.

Referring now to FIG. 3 there is shown a travelling waveguide optical modulator fabricated on the top surface (-Z face) 32 of a Z-cut lithium niobate substrate 34. A travelling wave electrode with an active region 36 is defined by an earth plane electrode 38 and hot electrode 40 as in the device of FIG. 1. A titanium indiffused optical waveguide 42 formed in the surface 32 consist of two straight portions 44 and 46 optically coupled by a reactively etched mirror surface 48. The waveguide arms 44 and 46 terminate at ends 52 and 54 at polished faces 56 and 58, respectively, which faces are perpendicular to the waveguide arms 44 and 46. The hot electrode has wider portions 47 away from portions $S_3$ and $S_4$ to reduce microwave loss. The distance between the earth plane and hot electrode should be adjusted in a known manner as the hot electrode is changed in size to maintain a constant characteristic impedance.

A waveguide for operation at wavelengths from about 0.4 $\mu$m to 4 $\mu$m can be manufactured as follows. Titanium is deposited on the -Z face by e-beam evaporation to a thickness of between 40 and 160 nm and a width of 4 $\mu$m to 16 $\mu$m. Diffusion is carried out at a diffussion temperature of 1050° C. with $O_2$ flowing at a rate of 3l/minute through a hot (56° C.) water bath and bubbler for approximately 7$\frac{1}{2}$ hrs. A silica film is then deposited by c.v.d. on the substrate to a thickness of about 0.25 $\mu$m. The device is then polished to form the mirrors and end faces, 50, 56 and 58.

Aluminium 5 $\mu$m thick is deposited and an electrode pattern formed using TF20 photoresist which is then plasma etched using $CCl_4$ etchant gas.

The waveguide 42 lies within the active modulating region 36 at two equal length sections $S_3$ and $S_4$ each of length $L_2$. In a similar fashion to the device of FIG. 1, an optical signal enters the waveguide 42 at end 54 and travels through the active region $S_3$. It then splits away from the active region at the splitting point $A_3$ to be reflected by the surface 48 to the rejoining point $A_4$ for the where it passes through the active region $S_4$ before exiting from end 52.

The analysis of this device is as for the one shown in FIG. 1, namely that the optical signal is delayed relative to the microwave signal between $A_3$ and $A_4$ to compensate for the walk-off during passage along $S_3$. In this case for Nm about 4.3 and $N_o$ about 2.2, the contained angle between arms 44 and 46 is 29°, $L_2$ 4 mm, $A_3$-$A_4$ for the optical waveguide = 8 mm and $A_3$-$A_4$ for the travelling wave electrode is 2 mm. The length $L_2$ is determined by $f_d$ which in this instance is approximately 20 $GH_z$.

The rephasing will occur in the general case when $$([A_3 \text{ to } A_4]_{opt} + L_2)/V_o = ([A_3 \text{ to } A_4]_{elec} + L_2)/V\mu$$

In LiNbO$_3$ Vo/V$\mu$ approximately 2 so replacing occurs in the FIG. 2 embodiment if $$[A_3 \text{ to } A_4]_{opt} - L_2/Vo = [A_3 \text{ to } A_4]_{elec}/V\mu$$

e.g.
$L_2 = 6$ mm,
$[A_3 \text{ to } A_4]_{opt} = 10$ mm,
$[A_3 \text{ to } A_4]_{elec} = 2$ mm.

Figure 4:
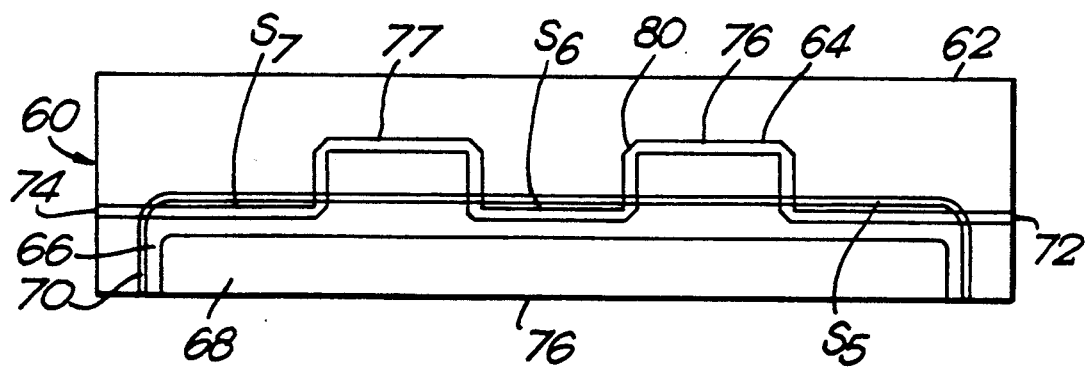
FIG. 4 is a diagramatic plan view of a fourth embodiment of the present invention in which the optical waveguide includes several reflective elements fabricated within the substrate.

Referring now to FIG. 4, a travelling wave optical modulator utilises reflective surfaces within, the volume of the substrate to define the optical waveguide delays. The modulator 60 is formed on a Z-cut lithium niobate substrate 62 from a $T_i$ indiffused optical waveguide 64 having sections S$_5$, S$_6$ and S$_7$ within a linear active modulating region 66 defined by an earth plane electrode 68 and a hot electrode 70 with ends 72 and 74 at polished substrate surface 76. An optical signal entering the waveguide 64 at end 72 is reflected round the delay loops 76 and 78 between active sections S$_5$, S$_6$ and S$_7$ by reactive etched mirrored surfaces of which only one 80 is numbered for clarity.

The lengths of the active regions and electrode and waveguide paths between active regions are as in FIG. 2 so the same analysis applies as to that embodiment. This device however has three active regions compared to the two of FIG. 2.

The mirrors 80 and 48 can be formed by other methods for example ion beam milling.

The structure of FIG. 3 can usefully be employed on x or y-cut LiNbO$_3$ with the appropriate lateral shift of the electrodes to define a field active region in the sections S$_5$, S$_6$ and S$_7$. To avoid leakey modes the waveguides are fabricated approximate parallel to the crystal Y and Z or X and Z axis. ($\pm 5°$).

The active region and optical delay sections can be repeated as often as desired as the relative positions of the microwave and optical signals is reset for the start of each successive active region S$_i$.

Devices can be formed according to the present invention in which the active region is not sufficiently long to cause full walk-off of the electrical and optical signals but some fraction thereof. In such cases the delay to be imposed on the optical signal will need to be smaller to compensate for the reduced walk-off.

Substrates other than LiNbO$_3$ can be employed in the production of the present invention for example LiTaO$_3$.

The invention finds application in many areas where electro-optic guidewave devices are used e.g. phase modulators, Mach Zehnders and directional couplers.

I claim:

1. A travelling wave optical modulator comprising a substrate, an optical waveguide defined within the boundaries of a surface of the substrate; a travelling wave electrode by which a modulated electric field of a predetermined frequency is applicable to at least a portion of the optical waveguide; and one or more delay portions between a respective splitting point and rejoining point where the optical waveguide is separated from the electrode and for which the transit time between the splitting point and rejoining point is greater for an optical signal in the optical waveguide than for the electric field in the electrode.

2. An optical modulator as claimed in claim 1 in which the splitting point occurs when the walk-off between the electric field and optical signal results in their relative phase reversal.

3. An optical modulator as claimed in claim 1 in which the optical waveguide includes one or more reflectors within the delay portions.

4. An optical modulator as claimed in claim 1 in which the optical waveguide comprise a titanium indiffused waveguide.

5. An optical modulator as claimed in claim 1 in which the optical waveguide comprises a proton exchanged waveguide.

6. An optical modulator as claimed in claim 1 in which the substrate comprises lithium niobate.

7. An optical modulator as claimed in claim 6 in which the lithium niobate substrate is Z-cut.

8. A travelling wave optical modulator comprising:
   an optical waveguide on the surface of a substrate;
   a travelling wave electrode applying a modulated electrical field of a predetermined frequency to a portion of said waveguide;
   at least one delay portion between a splitting point and a rejoining point where the said waveguide is separated from said electrode and for which the transit time between the splitting point and rejoining point is greater for an optical signal in the optical waveguide than for the electrical field in the electrode.

* * * * *